UNITED STATES PATENT OFFICE.

OTTO HUBER, OF ROCK ISLAND, ILLINOIS, ASSIGNOR TO SCHNEIBLE COMPANY, OF CHICAGO, ILLINOIS, A CORPORATION OF NEW JERSEY.

MANUFACTURE OF FERMENTED LIQUORS.

950,791.
No Drawing.

Specification of Letters Patent. Patented Mar. 1, 1910.

Application filed March 5, 1909. Serial No. 481,502.

*To all whom it may concern:*

Be it known that I, OTTO HUBER, a citizen of the United States, residing in the city of Rock Island, in the State of Illinois, have invented certain new and useful Improvements in the Manufacture of Fermented Liquors, of which the following is a specification.

The general object of this invention is to shorten the time of manufacture and to improve the quality of fermented liquors, particularly fermented malt liquors.

The improvement has been developed with especial reference to the manufacture of fermented liquors as disclosed in Letters Patent of the United States granted to Joseph Schneible, No. 694,671, dated March 4, 1902, and No. 734,756 dated July 28, 1903, but the invention is not limited to use in connection with the steps of the manufacture precisely as set forth in said several Letters Patent.

In the manufacture of malt and other fermented liquors it is well understood that the liquor which is separated from the yeast, after the principal fermentation, still carries in suspension a great number of undeveloped yeast cells which are difficult to eliminate completely and, if retained, impart to the liquor a flavor which is sometimes regarded as undesirable. The elimination of such undeveloped yeast cells is accomplished to a greater or less extent in the process of manufacture described in said several Letters Patent, but it is the special purpose of this invention to make such elimination practically complete and to effect this result in a comparatively short space of time.

In the manufacture of fermented liquor as carried on by processes other than those referred to the elimination of light, undeveloped yeast and other suspended matter not readily separated from the newly fermented liquor is accomplished by storing the liquor, after separation from the fully developed yeast, under suitable conditions of temperature, for a period of time, which is usually at least two months. During such period of storage the liquor is exposed to the danger of contamination or infection and the desirable extract matter contained in the newly fermented liquor is subject to deterioration, the extract matter in malt liquor, for example, being so affected as to impair the foam keeping quality of the finished liquor, so that it becomes necessary to introduce into the liquor a quantity of fresh fermentable extract with yeast, in order to restore this quality, as well as to bring about the generation of gas in the liquor. The fermentation which is thus induced usually goes on at such low temperature that a complete fermentation of the fermentable matter is prevented, and although such treatment in a measure corrects the impairment of the extract composition which has taken place during storage, it nevertheless of necessity results in the introduction of substances which tend to defeat the purpose of storage.

In accordance with the present invention, the development of the undeveloped yeast cells, instead of being checked by low temperature, is rapidly effected, immediately after the separation of the fully developed yeast and without the usual storage, as by introducing into the previously fermented liquor, which has been separated from the fully developed yeast, a quantity of yeast food such as readily fermentable matter, preferably free from yeast cells, especially from such as would bring about the formation of a fresh crop of yeast cells of a different stage of development from those previously remaining in the liquor, and when the light, undeveloped yeast cells formerly held in suspension have thus been developed and made readily separable, the separation of the liquor from the newly developed yeast cells is effected. Inasmuch as all of the light, undeveloped yeast cells formerly contained in the liquor after fermentation and after the first separation are substantially at the same stage of development, practically all of them are brought, during this immediate and rapid development, to a stage of development which will permit them to be separated, so that the liquor, after the second separation, contains practically no light or undeveloped yeast cells.

It will be obvious that the manner of practicing the invention may be varied more or less to suit different conditions. In general, however, the invention is carried out in a continuous process, without any period of rest or storage, substantially as follows: The liquor to be treated, having first undergone fermentation for a sufficient period and under conditions favorable to proper fermentation and having been separated from the fully developed yeast in any suitable manner, but still containing in suspension a quantity of light, undeveloped and undesirable yeast, is placed immediately in a clean vessel; then at once, and without an intervening period of rest or storage, there is added to this separated liquor a quantity of yeast food, preferably readily fermentable matter in solution, such as wort or other suitable solution containing readily fermentable sugar; the purpose and result of such addition of readily fermentable matter are to nourish and develop rapidly the suspended yeast and thus bring it into a condition suitable for easy separation; finally the liquor is separated from the newly developed yeast and other matter which may be carried with it.

Preferably the development of the suspended yeast is carried on while the previously fermented and separated liquor is still at a temperature which is favorable to complete and rapid fermentation and usually requires from two to four days for completion. The quantity of wort or other solution containing fermentable sugars which is added is only sufficient to nourish and develop the light and undeveloped yeast which is in suspension to a stage which will permit separation, without inducing a propagation of the yeast cells and, as these yeast cells are practically all at the same stage of development, the liquor which is afterward separated from the newly developed yeast, is practically free from the undeveloped yeast cells which are largely responsible for undesirable flavors in liquors finished by processes hitherto employed. It will be understood, moreover, that the quantity of fermentable matter, which is thus added, may vary with the character of the yeast and the condition of the liquor. The quantity is usually sufficient to show an increase in the extract percentage of from .2% to .5% Balling above that which is possessed by the previously fermented liquor to be treated.

After the separation of the liquor from the newly developed yeast cells, this liquor, practically free from light and undeveloped yeast, may be finished by any suitable method, the best results being secured by proceeding substantially in the manner prescribed in said several Letters Patent, and particularly in said Letters Patent No. 734,756, viz: by cooling and charging the liquor with carbonic acid gas, preferably with the fresh gas of fermentation, and thereafter resting the charged liquor while coagulation and separation of the albuminous matters and final and complete separation of such yeast cells as may still remain take place.

The improved process is to be clearly distinguished from the ordinary kraeusening process, both in purpose and in operation. In the improved process the purpose is the elimination of the light and undeveloped yeast cells which have heretofore remained in the liquor and have imparted thereto an undesirable flavor, and this purpose is accomplished by the rapid development of such yeast cells to a stage in which it becomes practicable to separate them from the liquor and then effecting the separation, all in a process continuous with the first fermentation and without any period of rest or storage. In the kraeusen process the purpose is the development of gas in the beer by fermentation and to accomplish this there is added to the still beer, after the first fermentation and, usually, a period of rest, and while the beer contains the light and undeveloped yeast cells, a certain percentage of kraeusen, or wort in the first stage of fermentation, and the new fermentation which is thus established, is permitted to continue for a considerable period of time until the desired amount of gas has been developed.

I claim as my invention:

1. The improvement in the manufacture of fermented liquors which consists in fermenting the wort, separating the liquor from the developed yeast cells, immediately and rapidly effecting the development of the light and undeveloped yeast cells by the addition of yeast food, and separating the liquor from the thus developed yeast cells, all in a continuous process without rest or storage.

2. The improvement in the manufacture of fermented liquors which consists in fermenting the wort, separating the liquor from the developed yeast cells, immediately and rapidly effecting the development of the light and undeveloped yeast cells by the addition of yeast food, separating the liquor from the thus developed yeast cells and cooling and charging with gas the separated liquor, all in a continuous process without rest or storage.

3. The improvement in the manufacture of fermented liquors which consists in fermenting the wort, separating the liquor from the developed yeast cells, immediately and rapidly effecting the development of the light and undeveloped yeast cells by the addition of a solution of readily fermentable sugars, and separating the liquor from the thus developed yeast cells, all in a continuous process without rest or storage.

4. The improvement in the manufacture of fermented liquors which consists in fermenting the wort, separating the liquor from the developed yeast cells, immediately and rapidly effecting the development of the light and undeveloped yeast cells by the addition of a solution of readily fermentable sugars, separating the liquor from the thus developed yeast cells, and cooling and charging with gas the separated liquor, all in a continuous process without rest or storage.

This specification signed and witnessed this second day of March, A. D., 1909.

OTTO HUBER.

Signed in the presence of—
  JOSEPH SCHNEIBLE,
  J. GOWAN STOBO.